US009531649B2

(12) United States Patent
Rideout et al.

(10) Patent No.: US 9,531,649 B2
(45) Date of Patent: *Dec. 27, 2016

(54) IDENTIFICATION OF MESSAGE RECIPIENTS

(71) Applicant: Google, Inc., Mountain View, CA (US)

(72) Inventors: Joseph Rideout, Waterloo (CA); Brett R. Lider, San Francisco, CA (US)

(73) Assignee: Google Inc., Mountain View, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/846,324

(22) Filed: Mar. 18, 2013

(65) Prior Publication Data
US 2013/0227041 A1 Aug. 29, 2013

Related U.S. Application Data

(63) Continuation of application No. 12/787,822, filed on May 26, 2010, now Pat. No. 8,433,764.

(60) Provisional application No. 61/302,951, filed on Feb. 9, 2010.

(51) Int. Cl.
H04L 12/58 (2006.01)
G06Q 10/10 (2012.01)
H04W 4/12 (2009.01)
H04W 4/20 (2009.01)

(52) U.S. Cl.
CPC .............. *H04L 51/00* (2013.01); *G06Q 10/107* (2013.01); *H04W 4/12* (2013.01); *H04W 4/206* (2013.01); *H04L 51/14* (2013.01)

(58) Field of Classification Search
CPC .................. H04L 12/58; H04L 12/5855; H04L 29/12594; H04L 51/14; H04L 61/3005

USPC ......................................................... 709/206
See application file for complete search history.

(56) References Cited

U.S. PATENT DOCUMENTS

| 6,418,466 B1 | 7/2002 | Bertram et al. |
| 6,446,115 B2 | 9/2002 | Powers |
| 6,539,421 B1 | 3/2003 | Appelman et al. |
| 7,069,309 B1 | 6/2006 | Dodrill et al. |

(Continued)

FOREIGN PATENT DOCUMENTS

WO 2008/150713 12/2008

OTHER PUBLICATIONS

Office Action in Australian Application No. 2013203582, mailed May 19, 2014, 3 pages.

(Continued)

*Primary Examiner* — Jeong S Park
(74) *Attorney, Agent, or Firm* — Fish & Richardson P.C.

(57) ABSTRACT

In general, the subject matter described in this specification can be embodied in methods, systems, and program products for identifying a recipient for an electronic post. An electronic post that was authored by an authoring user is received. The post is detected to include text that partially, but not fully, identifies a target recipient for the post. The text that partially identifies the target recipient is determined to be associated with a valid first user account for a first domain or a valid second user account for a second domain. The first user account or the second user account is selected as a selected user account for the target recipient based on the determining. The electronic post is transmitted to a different remote computing device that is associated with the selected user account.

21 Claims, 10 Drawing Sheets

(56) References Cited

U.S. PATENT DOCUMENTS

| | | | |
|---|---|---|---|
| 7,593,740 B2 | 9/2009 | Crowley et al. | |
| 8,433,764 B2* | 4/2013 | Rideout | G06Q 10/107 709/206 |
| 2002/0023138 A1* | 2/2002 | Quine | G06Q 10/107 709/206 |
| 2002/0065891 A1* | 5/2002 | Malik | H04L 29/1215 709/206 |
| 2003/0074472 A1 | 4/2003 | Lucco et al. | |
| 2003/0115280 A1* | 6/2003 | Quine | H04L 29/1215 709/207 |
| 2004/0054887 A1* | 3/2004 | Paulsen et al. | 713/154 |
| 2004/0243719 A1 | 12/2004 | Roselinsky | |
| 2007/0011257 A1* | 1/2007 | Jeong | G06Q 10/107 709/206 |
| 2007/0086064 A1* | 4/2007 | Koyama | G06Q 10/107 358/402 |
| 2007/0208868 A1 | 9/2007 | Kidd et al. | |
| 2007/0288575 A1 | 12/2007 | Gillum et al. | |
| 2008/0244014 A1 | 10/2008 | Britton et al. | |
| 2009/0043855 A1 | 2/2009 | Bookstaff et al. | |
| 2009/0049140 A1 | 2/2009 | Stoddard et al. | |
| 2009/0307602 A1 | 12/2009 | Brewer et al. | |
| 2010/0114613 A1* | 5/2010 | Smith et al. | 705/5 |
| 2010/0312837 A1* | 12/2010 | Bodapati | G06F 17/30864 709/206 |

OTHER PUBLICATIONS

Google. "Gmail: Auto-Complete." [Retrieved on Mar. 22, 2010]. Retrieved from the Internet <URL: http://mail.google.com/support/bin/answer.py?h1=en&answer=6597>.

Shaer, Matthew. "Facebook Rolls Out Revamped News Feed." The Christian Science Monitor; Oct. 23, 2000 [Retrieved on Jan. 27, 2010]. Retrieved from the Internet <URL: http://www.csmonitor.comllayoutlset/print/content/view/print/261662>.

Wikipedia. "Twitter." [Retrieved on 112712010]. Retrieved from the Internet <URL: http://en.wikipedia.org/wiki/Twitter>.

International Search Report & Written Opinion for Application No. PCT/US2011/024015, dated Nov. 4, 2011, 11 pages.

International Preliminary Report on Patentability for Application No. PCT/US2011/024015, dated Aug. 14, 2012, 8 pages.

Honeycutt et al., "Beyond Microblogging: Conversation and Collaboration via Twitter", System Sciences, 2009. HICSS '09. 42nd Hawaii International Conference on, IEEE, Piscataway, NJ, USA, Jan. 5, 2009, pp. 1-10.

European Search Report in European Application No. 11703800.0, mailed Apr. 9, 2014, 7 pages.

* cited by examiner

IDENTIFICATION OF MESSAGE RECIPIENTS

CROSS-REFERENCE TO RELATED APPLICATIONS

This application is a continuation of U.S. application Ser. No. 12/787,822, filed May 26, 2010, entitled "Identification of Message Recipients," which claims priority to U.S. Provisional Application Ser. No. 61/302,951, filed on Feb. 9, 2010, entitled "Identification of Message Recipients," the entire contents of which are hereby incorporated by reference.

TECHNICAL FIELD

This document generally describes techniques, methods, systems, and mechanisms for identifying recipients of an electronic message.

BACKGROUND

The present disclosure generally relates to messaging systems. A user of a computing device (e.g., an application telephone or a desktop computer) may use the device to post textual and multimedia posts (e.g., electronic messages) with a micro-blogging application, so that other people that use a micro-blogging service and that "follow" or "subscribe" to the user can receive the post. The post can be transmitted by the computing device to a server system that hosts the micro-blogging service. The server system may disseminate the post to the users that have subscribed to the author of the post.

SUMMARY

This document generally describes identifying recipients of an electronic message. An author of a post (e.g., an electronic message) to be disseminated by a micro-blogging service to users that subscribe to, or follow, the author may identify explicit recipients for the post. The explicit recipients may include users of the micro-blogging service who do not subscribe to posts that are created by the author. As an illustration, in a body of the post, the user may type "@username." The typed username, however, may not include a domain that specifies direct routing to the user account "username@domain.com." The micro-blogging service, however, may identify a domain for the username and may generate a full account name. For example, the domain may be identified as the domain of the author (e.g., a domain associated with a login name of the author). If the username is valid for the author's domain, the post may be forwarded to the account username@authorsdomain.com. If the username is not valid for the author's domain, a secondary domain may be queried to identify if the username is valid for the secondary domain, and the secondary domain may be used instead. Users in this document are generally correspond to particular user accounts with a server, and may be individuals, organizations, corporations, or other such members of a micro-blogging or similar message service.

In general, one aspect of the subject matter described in this specification can be embodied in a computer-implemented method for identifying a recipient of an electronic message. An electronic message that was authored by a posting user of a messaging service is received at a server system and from a first remote computing device. The posting user had logged into an account for the messaging service at the first remote computing device using a login username and a corresponding login domain name as credentials. The electronic message is determined by the server system to include a target username of a target user to receive the message, but not include a domain name for the target username. The target username is determined by the server system to not be a registered username for the login domain name. In response, the server system determines that the target username is a registered username for a second domain name. A second remote computing device at which a different user has logged into the messaging service using the target username and the second domain as credentials is identified by the server system. The electronic message is transmitted by the server system and to the second remote computing device.

Another aspect of the subject matter described in this specification can be embodied in a computer-implemented method for identifying a recipient for an electronic post. An electronic post that was authored by an authoring user is received at a server system and from a remote computing device. The post is detected by the server system to include text that partially, but not fully, identifies a target recipient for the post. The text that partially identifies the target recipient is determined to be associated with a valid first user account for a first domain or a valid second user account for a second domain. The first user account or the second user account is selected as a selected user account for the target recipient based on the determining. The electronic post is transmitted from the server system to a different remote computing device that is associated with the selected user account.

In yet another aspect, the subject matter described in this specification can be embodied in a system for identifying recipients of electronic messages. The system includes a message transceiver to receive, from remote computing devices, electronic posts generated by authoring users, and to transmit each generated post to a set of computing devices associated with respective recipient users. The system includes an authoring user domain identifier to identify, for each authoring user, a domain that the authoring user supplied as part of credentials in order to submit the post to the message transmission unit, wherein the domain identified for each authoring user is different. The system includes a handle identifier to identify, in each received post, a handle that partially, but not fully, identifies a target recipient user to receive the post. The system includes an account determination unit to determine, for each identified handle that partially identifies a target recipient user, that the handle is a registered username for the domain identified for the authoring user.

These and other implementations can optionally include one or more of the following aspects. A plurality of users that have previously requested to receive electronic messages that the posting user authors can be determined by a server system. A plurality of remote computing devices at which each of the plurality of different users have logged into the messaging service can be determined by the server system. The electronic message can be transmitted from the server system and to the plurality of remote computing devices. The electronic message can be modified, before transmitting the electronic message to the second remote computing device, to include the second domain name in addition to the target username, the second domain name placed adjacent or substantially adjacent to the target username in the modified electronic message. A display name for a user account that corresponds to the target username and the second domain name can be determined. The electronic message can be modified, before transmitting the electronic message to the second remote computing device, to replace the target username with the display name, the display name being different than the target username.

In yet additional optional aspects, the target username may be included in a body of the received electronic message, and may not be included within a field of the electronic message that solely designates recipient users. Between (i) the server system determining that the electronic message does not include a domain name for the target username, and (ii) the server system determining that the target username is a registered username for the second domain, the server system may not receive a communication from the first remote computing device identifying the second domain. The second domain may be a domain that the messaging service administers. The first domain may be determined by receiving, at the server system and from the remote computing device, a domain name submitted as credentials by the remote computing device during a login process by the remote computing device, the first domain based on the received domain name. The first domain may be the "domain_name" portion of credentials supplied as user input to the first remote computing device in the format "username@domain_name."

In yet additional optional aspects, the second domain is a domain of a messaging service provided by the server system, where the messaging service performed the receiving and transmitting of the electronic post, and the second domain is associated with a namespace of user accounts that are unique to the messaging service. A plurality of user accounts that have requested to receive posts that are authored by the authoring user may be identified by the server system. The electronic post may be transmitted from the server system to remote computing device associated the plurality of user accounts. Detecting that the post includes text that partially identifies the target recipient may include identifying a syntax identifier within text of the post, wherein the text of the post is user-input by the authoring user, wherein the syntax identifier is a pre-determined character or set of adjacent characters that identifies a handle associated with a target recipient of the post. Detecting that the post includes text that partially identifies the target recipient may include identifying the text that partially identifies the target recipient as textual characters that are adjacent to the syntax identifier without any intervening spaces.

In yet additional optional aspects, the electronic post may be modified to replace the text that partially, but not fully, identifies the target recipient for the post with different text, the modifying being performed before transmitting the electronic post from the server system. The different text may include the selected user account or a display name that corresponds to the selected user account and that is different than the text that partially identifies the target recipient. Each grouping of identified handle and corresponding domain that is determined by the account determination unit may be assigned as a user account for one of the recipient users for the post within which the handle was identified. The message transceiver, the authoring user domain identifier, the handle identifier, and the account determination unit may be included in a server system that provides a messaging service to users that supply authorized login credentials at remote computing devices. The handle identifier may be programmed to identify the handle by determining that the handle precedes or follows, without any intervening spaces, a pre-determined syntax identifier. The syntax identifier may be the '@' symbol. The handle identifier may be programmed to identify the handle by determining that the handle follows the '@' symbol without any intervening spaces.

Particular embodiments can be implemented, in certain instances, to realize one or more of the following advantages. Authors of posts may be able to identify explicit recipients for the posts by typing a handle of a recipient, without typing a full name or user account of the recipient. The micro-blogging service may resolve which of multiple domains the message may be transmitted to, without the author having to specify the domain. Thus, users may be able to type posts and identify explicit recipients more quickly and with fewer typed characters. A user may not need to remember a domain for an explicit recipient, and the micro-blogging service may perform the identification of the domain for the typed handle. Still, the user may be able to verify upon transmittal of the message that the message was indeed sent to the correct user account, as when the message is displayed to the user, the explicit recipient may be displayed inline with the message text.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
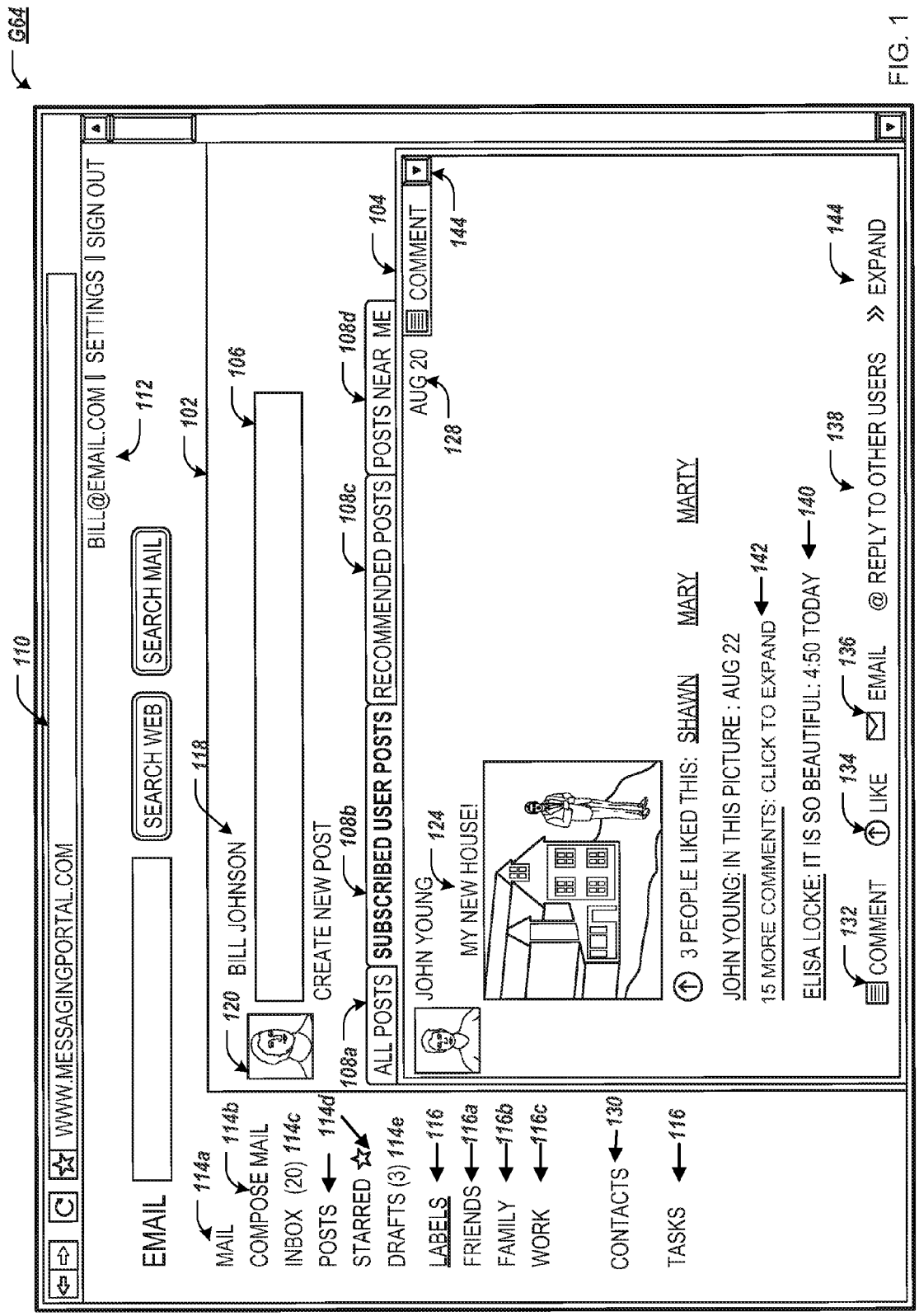
FIG. 1 is a screenshot of an example web-based messaging system interface.

This document describes techniques, methods, systems, and mechanisms for identifying recipients of an electronic message. In general, an author of a short textual or multimedia post (e.g., an electronic message) may use a computing device to transmit the post to a server system that is hosting a micro-blogging service. The server system may disseminate the post to computing devices that are associated with other users of the micro-blogging service (via being logged into user accounts for those users). In particular, the other users may "follow" or "subscribe" to the author, so that when the server system receives a post from the author, the server system determines which users subscribe to the author and distributes the post to these other users. The post that is received from the author might not include information that identifies these other users. The post may include an identification of the author of the post, which the server system may use to identify the subscribing users from a database. The server system may have previously received in communications from the subscribing users requests to subscribe to the author. The server system may have stored, in the database, identifications of the users that submitted requests to subscribe to the author.

The users that subscribe to the author may view the author's post by logging into a website by providing user-specific credentials. The website may display a stream of posts that the micro-blogging service pushes to each user (i.e., to a computing device that the user employed to log into the micro-blogging service). Each stream of posts may include posts that are authored by other users to whom the logged-in user "follows" or "subscribes."

An author of a post may identify explicit recipients for the particular post, in addition to the implicit recipients that "subscribe" to the author. For example, the author may type in a body of the post a syntax indicator (e.g., the "@" symbol) followed by a textual handle for a user (e.g., the text "JoeR"). The textual handle may be shorthand for the intended recipient. The shorthand handle may include information that partially, but not fully, identifies the intended recipient. As an example, JoeR may be shorthand for an account name "JoeR@exampledomain.com." In some examples, the handle is a username for an account. Entering the syntax indicator, followed by a user handle, may be referred to as "@replying" or "@sending" to another user.

The author may submit the post (that includes the text identifying an explicit recipient) from a computing device at which the post was authored (e.g., an application telephone) to a server system that is hosting the micro-blogging service. The server system may identify one or more handles in the body of the post (e.g., by searching for @ symbols that are followed by text without any intervening spaces and that are preceded by a space). The post, however, may not include a domain for the text that identifies the explicit recipient. Indeed, the author of the post may never have submitted the domain of the post in association with the handle (e.g., the author may only have submitted the domain in response to a modification of domain settings that are not specific to the post). The server system may resolve an account name (e.g., a username and corresponding domain name) for the identified handle and may transmit the post not only to users that subscribe to the author, but also to the resolved account names. The server system can resolve an account name for the handle by determining if the handle corresponds to a registered account for a domain of the post author. The domain for the post author may be the domain that the author supplied in his login credentials to access the messaging service and submit the post.

As an illustration, a user of the micro-blogging service may log into the service with an account name (e.g., author@exampledomain.com). The account name can include a username (e.g., "author") and a domain (e.g., "exampledomain.com"). The domain for the author may be the domain from the account name that was supplied to log into the service (e.g., exampledomain.com). Thus, when the author includes the text "@JoeR" in the body of a post, the server system can determine if "JoeR" is a valid username for the domain "exampledomain.com." In other words, the server system may determine if a user has previously registered for an account "JoeR@exampledomain.com." In effect, the micro-blogging service may not know the domain for "JoeR," but guesses that the domain of the posting user may be the correct domain, and checks to see if the handle is a registered username for the author's domain.

If the account name JoeR@exampledomain.com is valid (e.g., if the account name is assigned to a user), then the server system may transmit the post to the micro-blogging service account for JoeR@exampledomain.com. Thus, the next time that an individual logs into the micro-blogging service using the account name "JoeR@exampledomain.com," the user may be provided the post by the author. The micro-blogging service may enable users to log into the micro-blogging service using multiple different domains. Thus, the exact same post, but authored by users that logged in with different domains, may be transmitted to different user accounts (e.g., "JoeR@exampledomain.com," "JoeR@anotherdomain.com," and "JoeR@yetanotherdomain.com").

In some implementations, if the handle is not valid for the post author's domain, the micro-blogging service determines if the handle is valid for one or more other domains. Another domain may be a domain that is a default domain for users of the micro-blogging service. For example, although users of the micro-blogging service may log into the service with usernames for various domains that are not associated with the micro-blogging service (e.g., domains that the micro-blogging service may not administer), each user may be able to register for a unique handle for the micro-blogging service (e.g., handle@blogging_service_name.com). If the handle "JoeR" is not valid for the author's domain but is determined to be valid for the micro-blogging service, the server system may transmit the message to the user account "JoeR@blogging_service_name.com."

The micro-blogging service may identify other domains to be checked to determine if the handle "JoeR" is valid. An example other domain may be a domain for a different micro-blogging service (e.g., TWITTER), where the author has configured the micro-blogging service to receive incoming posts from the different micro-blogging service or transmit outgoing posts to the different micro-blogging service. In some examples, the user may manually enter or select several domains for which account validity determinations are to be performed (e.g., domains for the user's work organization, school organization, and community organization). In some examples, the micro-blogging service searches through a contact list that is stored for the user of the micro-blogging service (e.g., in an on-line calendar and contacts service under the user's account) and identifies domains that are associated with individual contact record entries (e.g., domains from email addresses in the contact list).

The various domains may be ranked in a hierarchy. For example, a validity check for the handle may be sequentially performed for: (1) the author's domain, (2) a school domain, (3) an outbound micro-blogging service, and (4) domains in the address book, in this example respective order. The first of the various domains where the handle is identified as valid (e.g., where the handle is a pre-existing username for the domain) may be selected for the handle, and an associated account name (e.g., handle@valid_domain_name.org) may be added to a list of recipients for the post. The domain determination may be performed by the server system, such that the determined domain may not be transmitted over the network from the author's computing device to the server system.

In some examples, each domain for which the handle is a valid username is assigned a weight, and the domain with the highest weight is selected as the matching domain. The weight for each domain may be selected based on: (i) a history of the author @replying users of the domain (e.g., a quantity of times that users of the domain are @replied by the author, or a frequency of @replying to users of the domain), (ii) a number of users of the domain in a contact list that is stored for the author, (iii) a quantity of users of the domain that follow the author, and (iv) a quantity of users of the domain that the author follows. The described statistics may be used to assign a user-specific global weight to each domain.

In some examples, each domain is assigned a handle-specific weight. For example, JoeR may be a username for two separate domains (e.g., JoeR@domainA.com and JoeR@domainB.com), but the author may have interacted with JoeR at a first of the domains more than the other. For example, the author may have emailed or @replied the user account JoeR@domainA.com more than he emailed or @replied the user account JoeR@domainB.com. Thus, the account JoeR@domainA.com may be selected as a recipient account. The handle-specific weighting may account for statistical factors that are specific to the handle as a username for the weighted domain. In contrast, global weighting may use statistical information for multiple user-names for the weighted domain.

FIG. 1 is a screenshot of an example web-based messaging system interface. The interface 100 can be viewed by a user of the micro-blogging system after logging into the user's account. The interface 100 can enable the user to submit posts and receive posts from other people. In this illustration, Bill Johnson has logged into the messaging interface 100 and is viewing, in the content region 102 of the interface, a post 104 from John Young. A user account may be associated with a computing device when the user account is "logged in" at the particular computing device. Tabs 108a-d allow Bill to view differently filtered lists of posts. Bill can author and submit a post using the input area 106.

More specifically, Bill can visit the messaging interface 100 with an internet browser by typing a URL associated with the portal into the address bar 110. Bill may be prompted to enter his username and password before he is provided use of the interface 100. Upon having logged in, the user account 112 that Bill is logged into may be displayed in the interface window.

User-selectable interface elements allow Bill to toggle presentation of content in the content region 102 of the interface. If Bill selects the "Mail" link 114a, a list of received email messages may display in the content region 102. Selection of the "Compose Mail" link 114b may invoke presentation in the content region 102 of an interface for sending emails to a recipient (e.g., by typing an email address for the recipient, typing a subject of the email, typing textual content, and clicking a submit button). Selection of the "Posts" link 114d may invoke the micro-blogging service interface that is displayed in the content region 102.

The micro-blogging interface can display a name 118 and picture 120 of the user that is associated with the account 112. In this illustration, the name "Bill Johnson" is associated with the user account "Bill" for the domain "email-.com." The input area 106 of the micro-blogging interface may allow Bill to submit content for dissemination to other users of the micro-blogging service. For example, Bill may move a mouse cursor over the input area 106 and click in the input area 160. Upon selecting the area, Bill may type a textual string of characters "I just had the best day ever, and want everyone to know it!" The characters may appear for display in the input area 106.

User-selection of the input area 106 may invoke a display of controls for adding multimedia content to the input area, or for inclusion in the post. For example, graphical user interface elements may appear after Bill clicks in the input area 106. The graphical user interface elements may enable Bill to add a picture to a post or a video to the post, either by selecting a source file on his computer or identifying a source file from a location on the internet. If Bill types or pastes a Uniform Resource Locator (URL) in the input area 106, a server system hosting the messaging interface (or code operating locally at Bill's client device) may identify the string of characters as a URL and fetch content from a computerized device that is associated with the URL for inclusion in the post. For example, the messaging service may present a list of pictures that linked to from a source document that is associated with the URL, and Bill can select a subset of the displayed pictures to include in the post that he is composing.

When Bill is satisfied with the post that he has generated in the input area 106, Bill may select a "Post" graphical interface element. In this example, the "Post" interface element is not displayed in the screenshot 100, and is provided for display upon user-selection of the input area 106. After selection of the "Post" interface element, Bill's post is transmitted by his client computing device over a network to a server system that hosts the micro-blogging messaging service. The server system may identify users that have requested to receive Bill's posts, and may transmit an instance of Bill's post to each user.

In some examples, the "post" may include only the textual and multimedia content that is visible to Bill, or the textual and multimedia content that is viewed by the recipient users. Thus, a description of all post content may be made by a person if the person can view a screenshot of either Bill's display or a recipient user's display. In other examples, the "post" includes additional information necessary to transmit the post, and for the server system to handle the received post. For example, the additional information may include an identifying number for Bill, a source uniform resource identifier (URI) for multimedia content, etc. The additional information may not be visible to Bill or recipient users. In some examples, a post does not identify users or user accounts of the subscribing users to whom the post should be transmitted or disseminated. The post, however, may include an @replied handle username.

The micro-blogging interface also displays posts from other users. For example, in the illustration depicted in FIG. 1, a single post 104 from the user John Young is displayed. John's post may be a most recent post or most highly ranked post of several posts that may be viewed by scrolling down in the interface using the scroll bar 122. John's post can also be referred to as an "activity" because the post, while originating with content from John, may be expanded with content from other users of the micro-blogging service. For example, in this illustration John's post includes the title "My New House!" 124 and a picture 126 of his house. John's post did not include any additional content and was submitted on the date 128 of August 20.

John's post 104 was received by the micro-blogging service's server system and disseminated to the other users of the micro-blogging service that had selected John as an individual that they would like to follow. For example, Bill may have selected the "Contacts" link 130 of his respective messaging service interface and entered into an input box John's email address and name. The micro-blogging service may have identified that John's email address was associated with a micro-blogging account and Bill may have requested to subscribe to John's posts. In some examples, John is prompted to confirm that Bill may receive his posts before John's posts are disseminated to Bill.

John's post 104 also shows that three people (Shawn, Mary, and Marty) "Liked" John's post. A "Like" is an indication, by a recipient of a post, that the recipient has a favorable opinion of the post. A like may be invoked by a single-input user selection of a graphical interface element (e.g., the "Like" button 134).

John's post also shows that on August 22, a user tagged or otherwise indicated that John Young was in the picture of the house. In this illustration, a user that tagged John is not identified, however, a visual identification of the tagging user may be provided, in some examples.

John's post includes a display of a comment 140, "It is so Beautiful" by Elisa Locke at a time of 4:50 today. Elisa Locke may have received a display of John's post in a micro-blogging interface similar to the one depicted in FIG. 1 Elisa may have selected a comment button 132 and entered the text "It is so Beautiful" into a comment input box. Upon sending the comment, John's post may be updated to include Elisa's comment (as illustrated in post 104), and the updated post may be re-disseminated to all post recipients. John's post 104 also includes an interface element 142 that enables Bill to expand a display of John's post to show comments from other users that are collapsed in the present view.

The messaging interface 100 includes mechanisms for Bill to interact with John's post 104. For example, Bill may select the comment interface element 132, and in response, user interface elements and controls may appear that enable Bill to generate and submit textual or multimedia content for inclusion in the post. The comment may be distributed to all users that received the post so that when these other users view the post they see Bill's comment. The post may be updated for all users, whether the users have viewed the post previously or not.

Bill can also select a "Like" interface element 134 to indicate his favorable opinion of the post. Selection of the "Like" interface element 134 can impact a scoring of the post (potentially increasing a likelihood that the post will be displayed to other users as a recommended post), alert other users that Bill thought that the post was interesting, and be used to develop a personalized model of posts that Bill likes (to aid in providing relevant content as recommended posts for Bill's account).

Bill may add other people to the post. For example, Bill may select the "@ Reply" interface element 138. In response, graphical interface elements and controls may display that enable Bill to identify other users of the micro-blogging service. Upon receiving identifications of these other users from Bill's client device, the micro-blogging service may add the other user's to a list of post recipients. Thus, John's post 104 may appear in the @replied users' post streams. The new, @replied users may be enrolled as subscribed to the specific post so that the new users are informed or able to view all new activity on the post (e.g., comments, likes, content added by John, etc.) The new users may be subscribed to the particular post, but may not be subscribed to the post author.

As discussed in more detail below, a user may @reply a post to another user by tying the @handle into the body of a post, or into a comment of the post. After the post or comment is submitted, the local machine or a server system may identify a full username for the handle (e.g., handle@domain.com) and add the user account associated with the full username as a subscribed user for the post.

As another option, Bill may email the post by selecting the email interface element 136 and entering an individual's email address. In response, the post content may be emailed to the individual's email account. The recipient of the post content may not be subscribed to the post (as with an @reply where updates on the post content are viewed with the received email message). The email message, however, may include a link or other mechanism that enables the user to subscribe to the particular post.

The "Expand" option 144 may enable Bill to expand John's post 104 so that all content associated with the post 104 (e.g., all content that he submitted, all comments, etc.) may be viewed at a single time in an expanded form. The post may increase in size within the interface 100 or may appear as a separate "pop-up" box that is overlaid on the interface 100. In some examples, the post 104 displays all users that are subscribed to the post, and whether the users subscribed to the individual post, follow the post author, were recommend to the post, or were @replied to the post. In some examples, users can select additional features through the drop down interface element 144. Example features can include an ability to delete the post from the user's stream, ignore additional activity on the post so that the post does not jump to the top of the user's stream with every comment, subscribe to the author of the post, and unsubscribe the author of the post.

As illustrated, John's post may not be solely static text or multimedia content that was submitted by John for dissemination to other users. The users that received the post may be able to comment on the post, add content, tag people in pictures or videos, and add other users to the post. Thus, the post may also be referred to as an "activity" that originates with John as the author, but may grow in content as other users contribute content to the activity.

The messaging system interface 100 includes several tabs 108*a*-*d* for switching "views." Each view may include a different set of posts. For example, each view may apply a different filter to the overall set of posts that Bill has received. The "All Posts" tab 108*a* may display all posts that the micro-blogging service has provided to Bill's account (e.g., because he subscribed to the author, subscribed to the post, or the post was recommended for display to Bill). The "Subscribed User Posts" tab 108*b* may display posts for authors that Bill has subscribed to, but may not include a display of posts that were recommended for Bill. The "Recommended Posts" tab 108*c* may include a display of posts that the micro-blogging system recommended for Bill, but may not include posts for authors that Bill subscribed to.

The "Posts Near Me" tab 108*d* may include a list of posts that were submitted by users near Bill, either users that Bill subscribes to or all users of the micro-blogging service that are near Bill's location. For example, Bill may identify a home location or zip code in the settings of the messaging system, or Bill's location may be identified through a Global Positioning System or other location-identification service that is associated with a mobile device upon which Bill is viewing the messaging interface 100. If a place of posting for a post (e.g., John's post) is near Bill's location, John's post may appear in the "Posts Near Me" tab 108*d*. The "Posts Near Me" tab 108*d* may also be weighted by time so that only recent posts are displayed (e.g., so that the stream illustrates recent activity around Bill's location). The "Posts Near Me" tab 108*d* may identify locations of the recent posts as graphical interface elements overlaid on a map.

Figure 2:
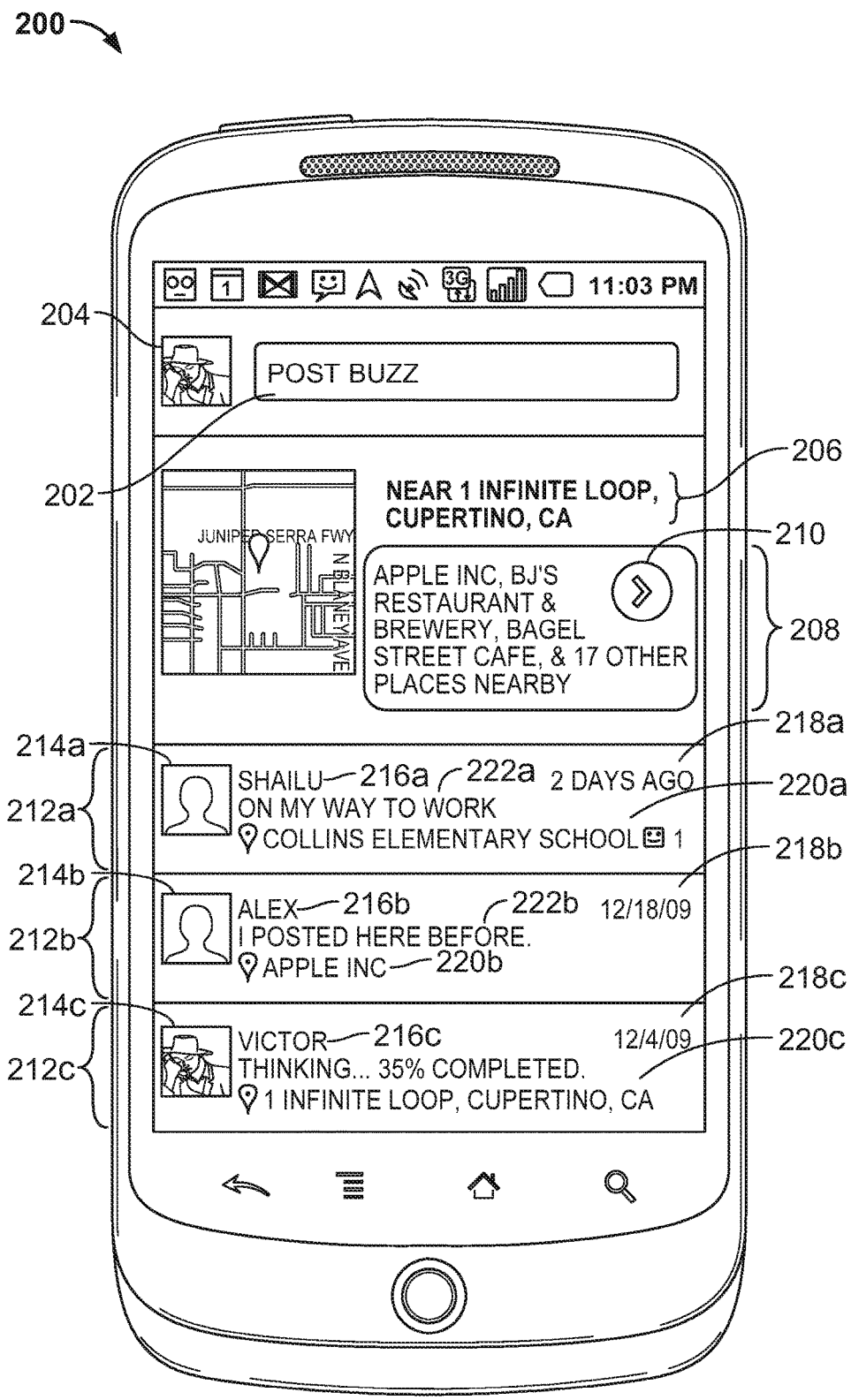
FIG. 2 is an illustration of a micro-blogging application invoked for display on a mobile telephone.

FIG. 2 is an illustration of a micro-blogging application invoked for display on a mobile telephone. The interface 200 can include a picture 204 of the user that is logged into the account, and an input box 202 for submitting posts that are associated with the user account—and for potentially specifying @replied handles in a body of the post. A present location 206 of the mobile computing device may be displayed in the interface 200. The present location may be determined by location-identification services (e.g., GPS, cellular identification, or Wi-Fi identification). The present location may be coordinates, an address, or a venue (e.g., a commercial business or public place). In some examples, the user can select his venue from a list of venues that are determined by a server system to be near an estimated geographical location of the mobile computing device.

The venues of interest box 208 can display a list of venues that may be near the mobile device's estimated geographical location. Selection of the expansion interface element 210 may invoke a display of detailed information for the venues of interest, or a display that enables selection of any of the venues of interest and subsequent display of detailed information (e.g., an address, map, hours of operation, website link).

The interface 200 may include a display of several posts 212a-c. Each post can include a picture of the poster 214a-c, a name of the poster 216a-c, a date of the post 218a-c, a place of posting 220a-c, and post content 222a-c. The post content may include a summary of original post content. Additional post content by the author, comments by other users, and other post content may be displayed in response to a selection of the post (e.g., by tapping on the post). In some examples, selection of the place of posting 220a-c invokes a display of the location of the place of posting (e.g., on a map). In some examples, the interface 200 for the application program may not be integrated with an email application (e.g., unlike interface 100).

Figure 3A:
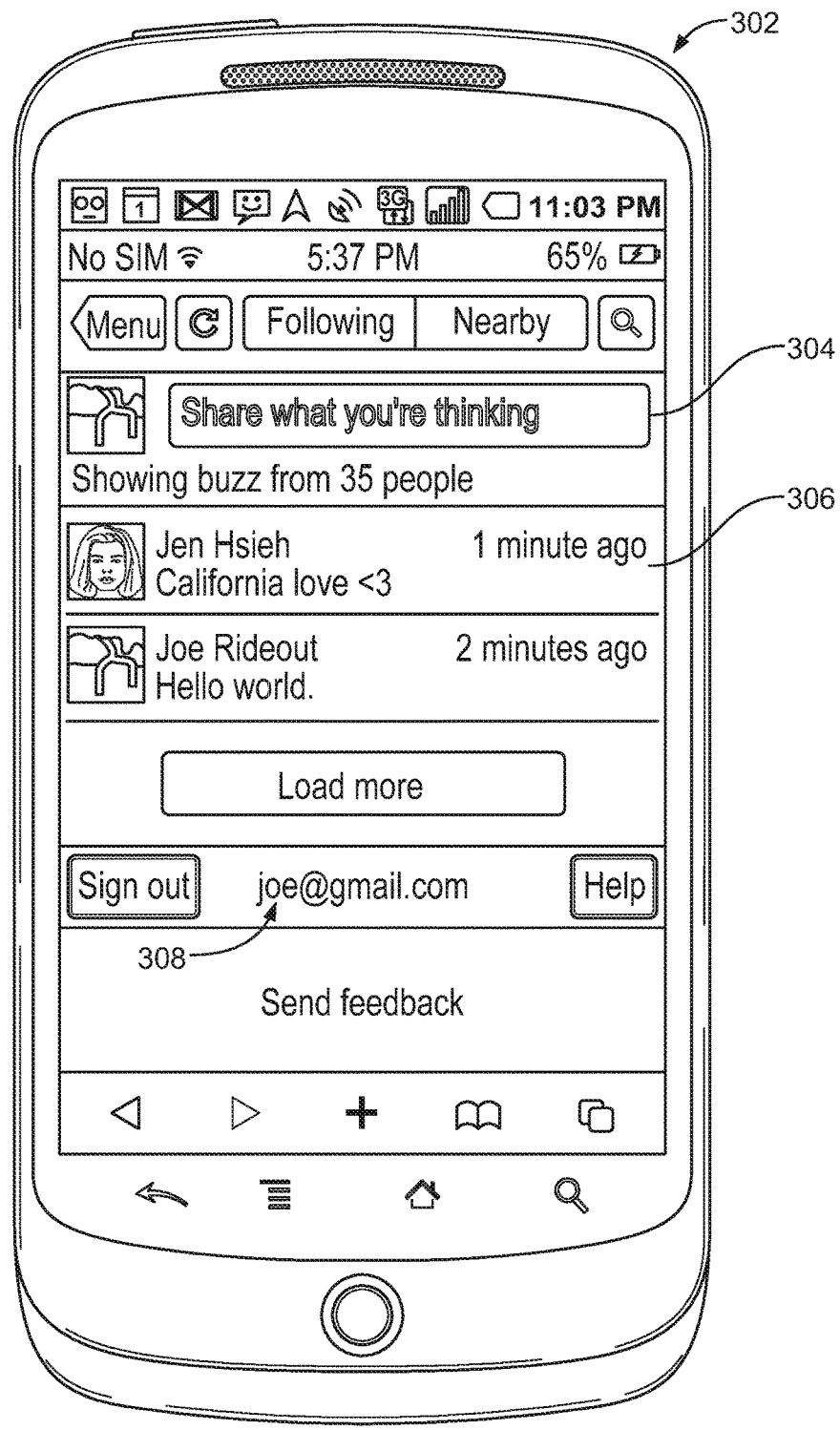
FIG. 3A-3D are screenshots of a micro-blogging application invoked for display on a mobile telephone.

FIG. 3A is a screenshot 302 of an interface invoked by a micro-blogging application on a mobile telephone. The display provided by the application includes an input box 304 for composing posts (and potentially specifying @replied users). Post 306 was submitted by Jen and is included in a stacked, vertical list of posts. Jen may have typed the text "California love <3" into an input box 304 of a micro-blogging application that was invoked on another mobile device, and pressed or otherwise selected a "Post" interface element. In this illustration, Joe 308 has logged into his user account for the micro-blogging application and has subscribed to posts that Jen Hsieh authors.

Figure 3B:
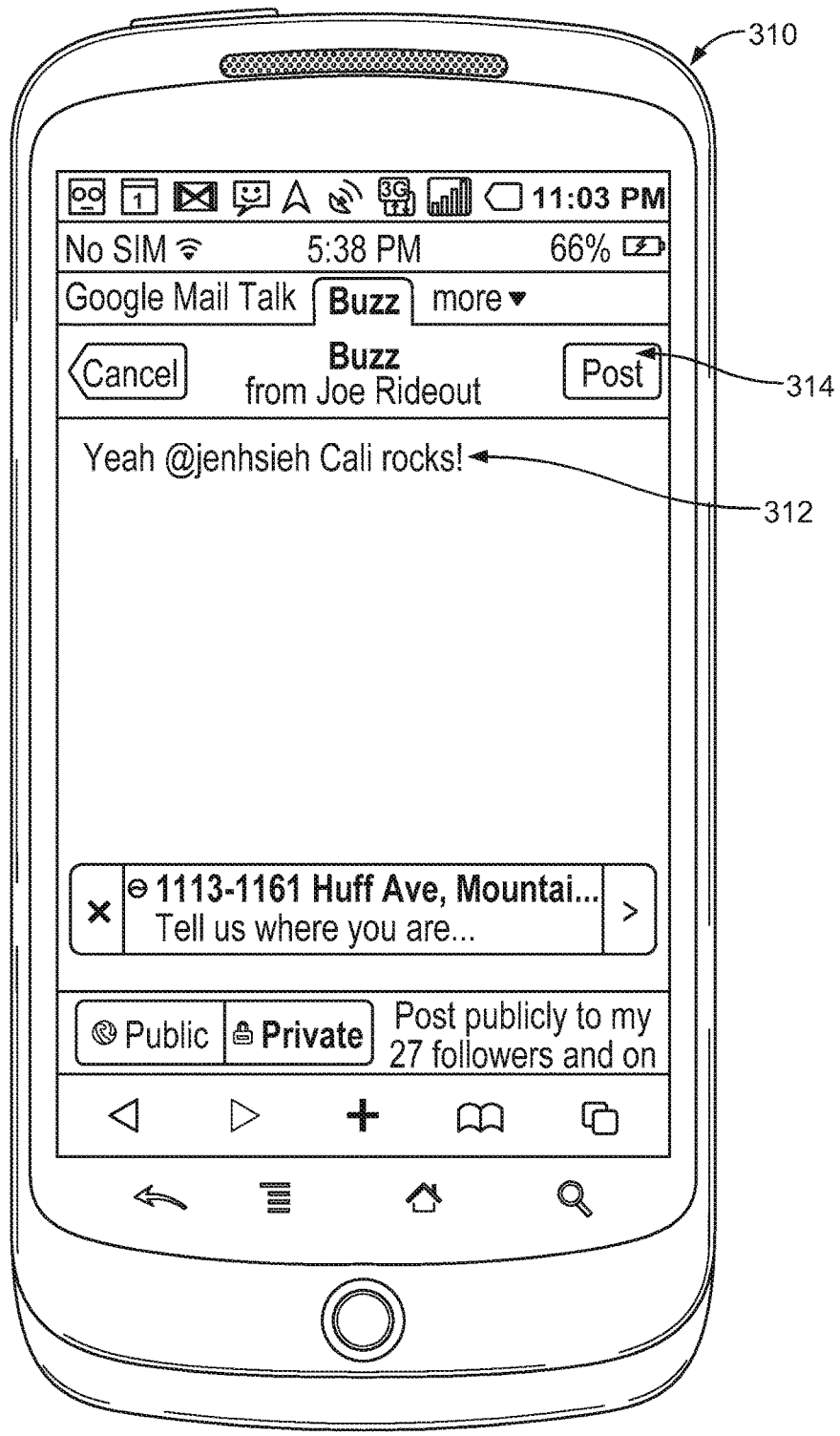

FIG. 3B is a screenshot 310 of an interface invoked by a micro-blogging application on a mobile telephone. Screenshot 310 may be provided in response to Joe selecting the input box 304 or selecting another graphical interface element that invokes capabilities for composing posts (e.g., a "Generate Post" interface element). In this example, Joe has typed the textual phrase 312 "Yeah @jensieh Cali rocks!"

Figure 3C:
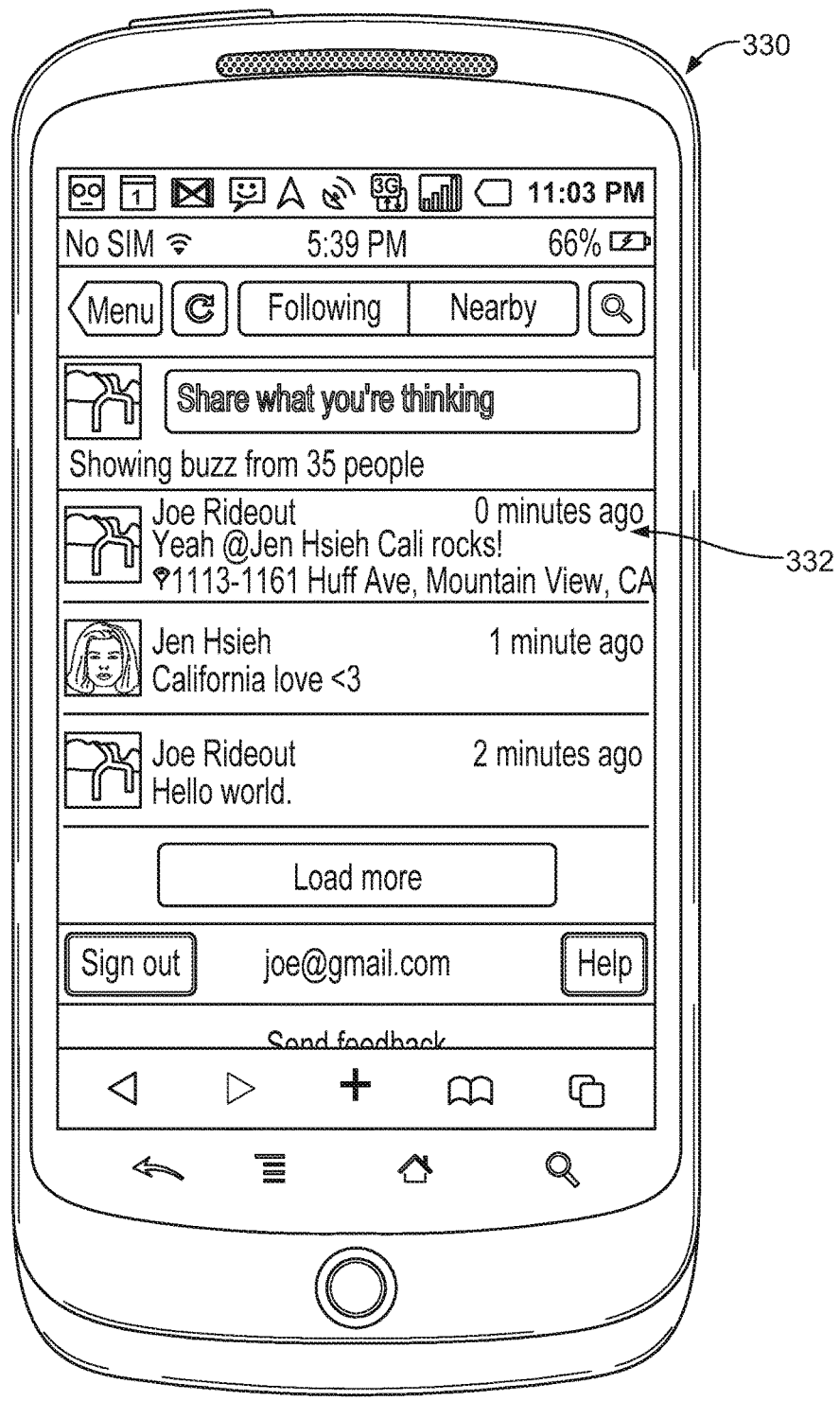

FIG. 3C is a screenshot 320 of an interface that is displayed in response to Joe selecting the "Post" interface element 314 of FIG. 3B. In this illustration, Joe's post 310 is added to his stream of posts. Joe's post has also been transmitted to a server system for dissemination to other users (e.g., users that subscribe to Joe and an explicitly defined user that is associated with the "jenhsieh" handle). As described in more detail later, the server system can identify a user account for "Jenhsieh," even though the handle may not include enough information to identify the user account with full certainty.

For example, the server system may identify that the username "Jenhsieh" is valid for the domain "workemail.com." Thus, identified user account may be "Jenhsieh@workemail.com." Further, the server system may identify a display name for the user account (e.g., a name to be displayed instead of the user handle or the user account). In this illustration, the identified display name for the account "Jenhsieh@workemail.com" is "Jen Hsieh." The post that is displayed to the author and disseminated to other users (e.g., the subscribing users and the explicit @relied user) may replace the @replied handle with the display text or the account name. In the illustration in FIG. 3C, the server system has replaced the text "@jenhsieh" with the display "@ Jen Hsieh."

Figure 3D:
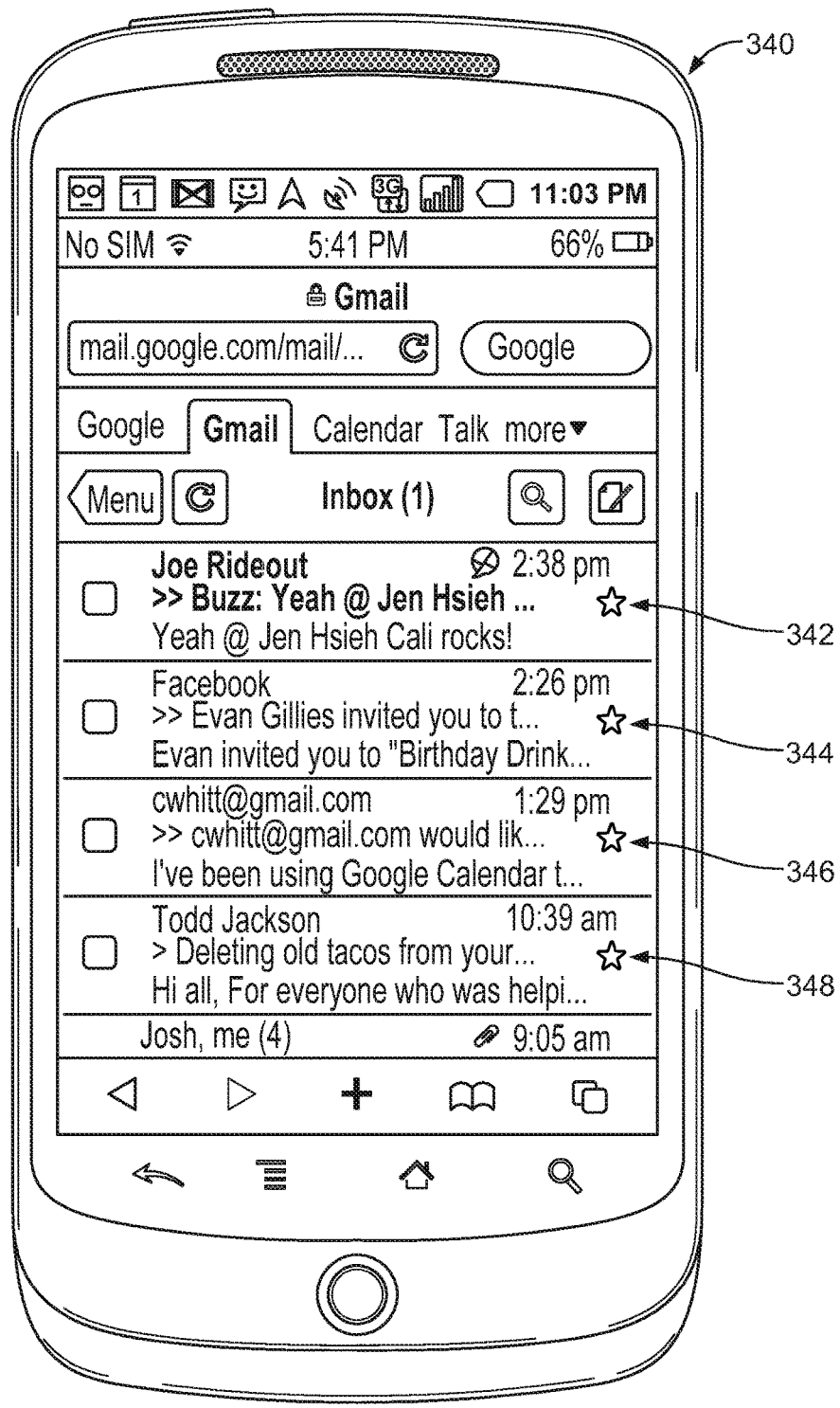

FIG. 3D is a screenshot 340 of an interface that is displayed to Jen as an @replied recipient of Joe's post. In this example, Joe's post 342 is fed into Jen's email inbox. For example, the interface displays a list of messages that includes Joe's post that was transmitted through a micro-blogging service, and other messages that were transmitted to Jen as emails. The received emails and micro-blogging posts are displayed as an integrated stream of messages. As illustrated in Joe's post 342, the text "@jenhsieh" has been replaced with the text "@ Jen Hsieh." Users that subscribe to Joe's posts may view a similar depiction of Joe's post 342.

Figure 4:
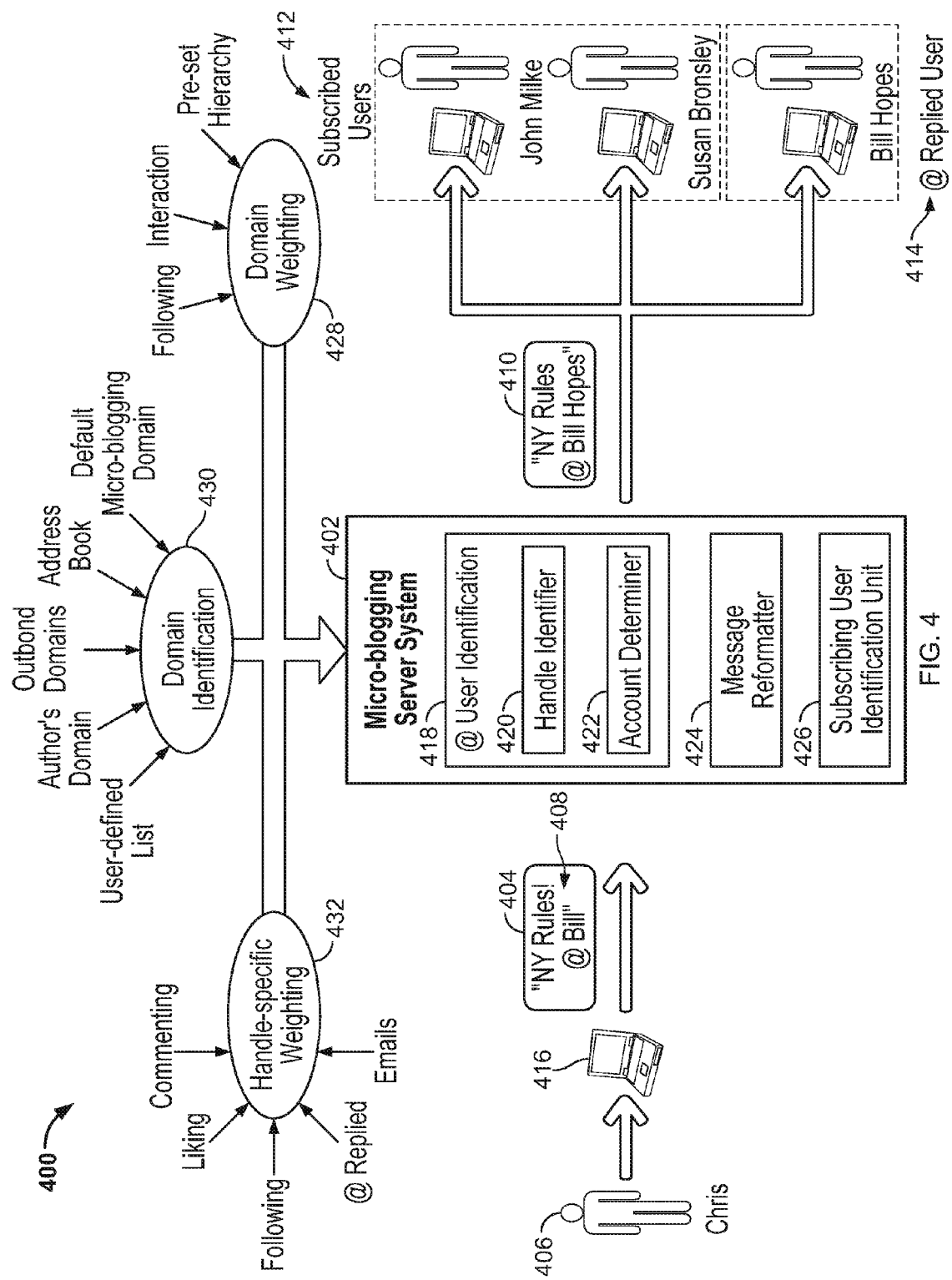
FIG. 4 is an example system for identifying message recipients.

FIG. 4 is an example system 400 for identifying recipients of an electronic message. The system includes a server system 402 that receives from user 406 a post 404 that includes a recipient handle 408. The server system 402 identifies a user account for the handle 408, and generates post 410 for dissemination to users 412 that subscribe to Chris's posts and the @replied user 414 that is associated with the identified user account.

In particular, user 406 has used credentials (e.g., chris@email.com) to log, using computing device 416, into a micro-blogging service that is hosted by the server system 402. Chris interacts with computing device 416 to compose the post 404 and provides user input that invokes operations to transmit the post from the computing device 416 to the micro-blogging server system 402, where the post may be disseminated to other users (e.g., the subscribed users 412 and the @replied user 414). The server system 402 includes an "@ User Identification" unit 418 that can determine a recipient @replied user account that is associated with the handle 408 and to which to the post 404 may be transmitted. The determined recipient @replied user may not have previously subscribed to Chris's posts.

The determination can be performed by first identifying, with the handle identifier 418, a handle that is included inline within the user-input text of post 404. The handle identifier may determine that the post 404 includes a syntax indicator (e.g., a pre-determined single textual character or combination of textual characters). In this illustration, the syntax indicator is the "@" symbol. The handle identifier 418 may determine whether or not a handle is associated with the syntax indicator. For example, a handle may be identified as a character or set of characters that precedes the syntax indicator or follows the syntax indicator. The handle may need to be adjacent to the syntax indicator so that no intervening spaces separate the handle and the syntax indicator. The side of the syntax indicator that opposes the indicator may include a space. For example, the phrase home@bill may not be identified as including a "handle" because the username home may be considered substantially adjacent to the domain (e.g., separated by the syntax indicator and without any intervening spaces).

The handle may be a full account name. For example, the post may state "NY Rules @bill@email.com," where bill@email.com may be considered a full account name because the account name includes both a username (e.g., bill) and a domain (e.g., email.com), separated by the "at" symbol. As illustrated above, however, the identified handle may not include a full account name. For example, the handle may not include a second @ symbol in a string of text that follows or precedes an @ symbol. Thus, in some examples, the string of text may not define both a username and a domain, and may only include a partial identification of a user (e.g., because many users may have the same username but for different domains). In examples where the handle is not a full account name, an account determiner 422 may determine if an account name for the identified handle can be resolved.

The account determiner 422 may determine an account name by identifying one or more domains 430, and determining if the username is valid for any of the identified domains (e.g., if the username is registered for the domain). From among the domains for which the username is valid, a domain may be selected. The domain may be selected by weighting the domains for which the username is valid 428. For example, various statistical factors may be used to assign each of the valid domains a different value, and one of the domains may be selected based on the assigned value.

Example signals used to weight a particular domain can include (i) a quantity of users from the particular domain that follow the post author, (ii) a quantity of users from the particular domain that the post author follows, (iii) interaction by the post author with users of the particular domain (e.g., email messages to the users, comments on the users' posts, or likes on the users' posts), (iv) interaction by users of the particular domain with the author's posts, and (v) a prominence of the particular domain in contact information in the author's contact list.

In some examples, however, a pre-set hierarchy or weighting is used and a determination of each domain's weight is not performed. For example, the author's domain may be queried first to determine if a handle is a valid username for the domain, followed by queries for other domains if the author's domain is not a match. If the author's domain is a match, the domain may be automatically selected (e.g., without querying other domains).

The domains may be identified 430 from multiple sources Example domains and domain sources can include (i) the post author's domain (e.g., the textual domain name or namespace for the account that the author used to log into the micro-blogging service), (ii) a user-defined list of domains (e.g., a hierarchy of domains selected by the user in a settings interface for the micro-blogging service), (iii) outbound domains (e.g., domains that the micro-blogging service interacts with through APIs to receive posts and disseminate posts, for example, twitter.com or facebook.com, (iv) domains in a book of contacts that is stored for the user and that the user supplies to the micro-blogging service or that the micro-blogging service can access, and (v) a default micro-blogging domain.

As an illustration of a "user-defined list of domains," Joe may be able to navigate to a settings interface page. The settings interface page may include user interface elements that enable Joe to type in multiple domains and assign each domain to a position in a sequential ordering of domains. For example, upon navigating to the page, Joe may see a single domain listed as "Email.com (Rank 1)."Most of Joe's friends, however, may not use "Email.com," but may use the email address that is supplied by Joe's university. Thus, Joe may enter the text "ExampleUniversity.edu," and the system may assign the university domain a rank of 2.

Joe may change the ranking of the domains so that the university domain is queried first to determine if an @relied handle is a valid username for the university domain. In some examples, Joe's user-input of a domain in a settings page, and a subsequent transmittal of the settings information to a server system, is the only user-input that Joe provides to identify domains. The posts themselves that are intended for dissemination to other users may not include the domain of the target recipient. Indeed, the transmittal of settings information may not be provided to other users of the social network in a post (as with posts that users that subscribe to the author receive). It may be provided only to an automated computer system or a human administered account.

The "default micro-blogging domain" is hereafter described in an illustration. The micro-blogging service may allow users to register for usernames that are unique to the micro-blogging service. Thus, even though Joe may log into the micro-blogging service with a user account that is associated with the "email.com" domain name, he may also sign up for a user account that is unique to the micro-blogging service. Indeed, Joe may login to the service with the account name "JoeR@email.com," and may attempt to register the username "JoeR" for the micro-blogging service, but another user may have registered the name first. Thus, the "namespace" for each domain may be independent of one another. Joe instead may need to register the username "JoeR55" for the micro-blogging service. A namespace may include a list of handles that are unique from one another, but specific to a particular domain. For example, for a particular namespace no two users may share the handle "Billy," but among several namespaces, many users may each have the handle "Billy." The domain for each namespace, however, may be different.

In some examples, the default micro-blogging domain may not include a textual domain name like other of the described domains (e.g., a "username" may stand on its own and may not be tied to a textual "microblogging.com" domain name). Instead, the username that is registered for micro-blogging service may be listed on a profile page for the user or used to identify a user in the micro-blogging service, but may not otherwise be displayed in a "username@microblogging.com" account name format. For example, a profile page that is associated with Joe may prominently display "JoeR55" and posts that Joe submits may include a display name of "JoeR55."

In some examples, handle-specific weighting 432 is performed for the identified handle 408. For example, the handle "bill" may be weighed as a username for various valid domains (e.g., domains where "bill" is determined to be a registered username). Among each valid domain, an identification of interaction with the corresponding user account may be performed. For example, the account determiner 422 may determine a level of interaction between Chris 406 and the individual user accounts for the valid domains (e.g., "bill@email.com" and "bill@schoolemail.com"). For example, the weight of each user account may be based on a level of commenting by the post author (e.g., Chris 406) on posts that are authored from the user account (e.g., bill@email.com), or a level of commenting by the user account (e.g., bill@.email.com) on the author's posts (e.g., Chris 406). Similarly, a number of likes, a number of @replies, or a number of emails between the author and the corresponding account may be used to determine a weight value for individual user accounts of valid domains. Further, whether the author follows the user account, the user account follows the author, or the author and the user account follow each other may be used to determine a weight value for an individual user account of a valid domain.

Upon determining a domain and a user account that corresponds to the combination of the handle and the domain, the server system 402 may retrieve information that is particular to the account. For example, the server system may identify a display name for the account, where the display name may be different than the handle or the account name. For example, the account bill@email.com may be associated with the display name "Bill Hopes." The message reformatter 424 may modify the content of the message so that the message includes either the full account name or display name in place of the handle 408.

The subscribing user identification unit 426 may identify a group of users of the micro-blogging service that requested to receive posts by Chris 406. In response to identifying a user account for the @replied user 414 (e.g., Bill Hopes) and user accounts for the subscribing users 412 (e.g., John Milke and Susan Bronsley), the reformatted post 410 is provided to the group of recipient users. For example, when the recipient users log into an application that provides a display of a stream of posts that are authored by users of the micro-blogging service, the logged in users may view the post 410 that was authored by Chris. The users' content streams may not include posts that were not authored by an individual to whom they subscribed, unless the users were specifically @replied in a particular message.

Figure 5:
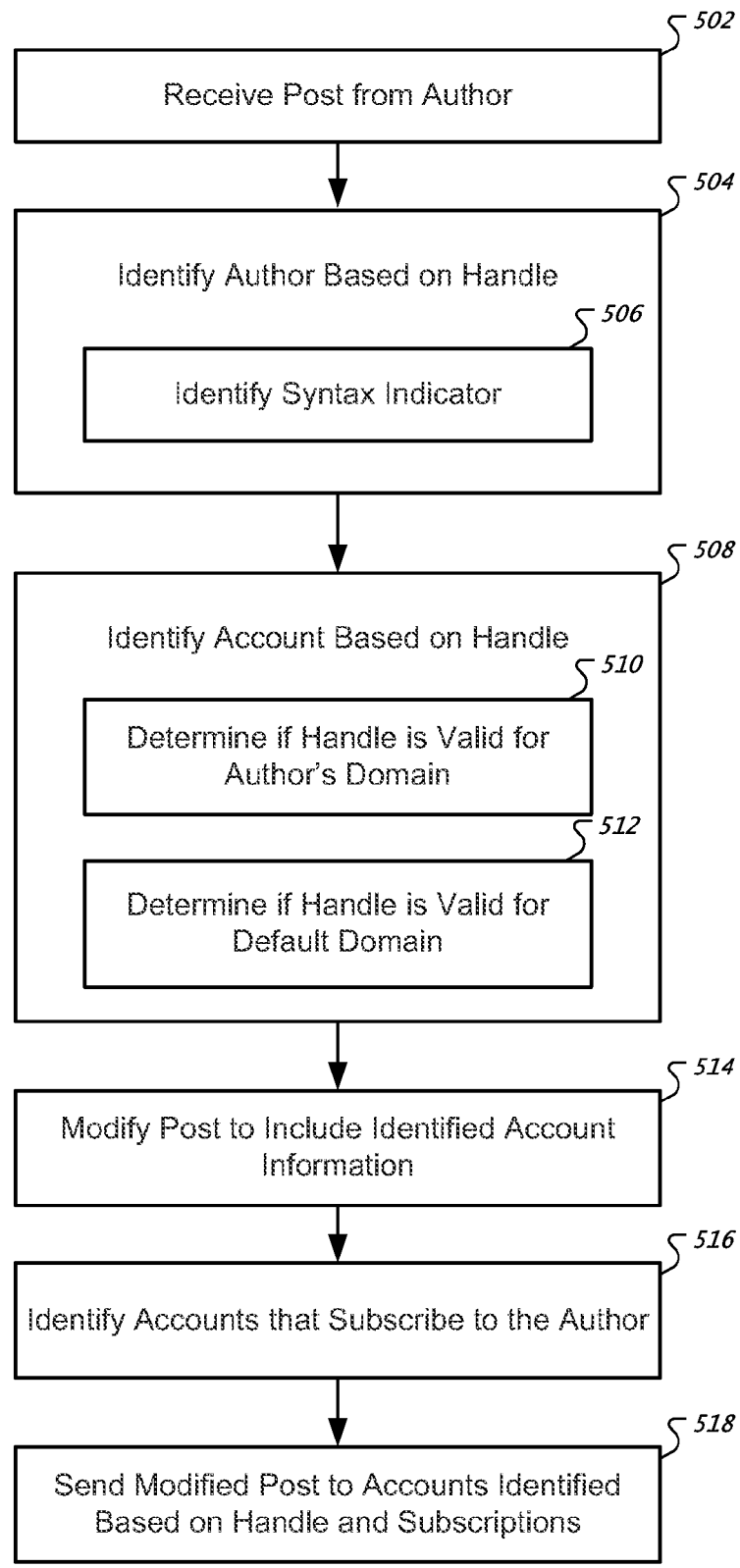
FIG. 5 is an example process for identifying message recipients.

FIG. 5 is an example process 500 for identifying recipients of electronic messages. In box 502, a post is received from an author. For example, the server system 402 may receive the post 404 that was transmitted by the computing device 416 to the server system. The post may be transmitted as an electronic message over a network (e.g., the internet).

In box 504 a handle in the post is identified. The handle may be identified by first determining if the post includes a syntax indicator (box 506). The syntax indicator may be a character or a sequence of characters that are inline with other text in a body of the message. For example, the syntax indicator may be the "@" symbol. The handle may include text that follows or precedes the "@" symbol without any intervening spaces. In some implementations, the handle is identified in a header of the message (e.g., a "to" field). In some implementations, the handle is not identified in a field that is designated to solely identify recipient users. The handle may be included within a body of the message that includes as additional content prose that does not specifically identify the recipient users.

In box 508, an account is identified based on the handle that was identified within the post. For example, the handle may be the characters "dinosaur65." A determination if the handle is valid for the author's domain may be performed (box 510). For example, the server system 402 may query a database of registered usernames for a domain of the posting author to determine if "dinosaur65" is registered for the author's domain. The database may be maintained by the domain of the posting author (e.g., access to the database may be provided through an Application Program Interface). In some examples, the author's domain may provide a list of registered usernames to the server system 402. As an illustration, the author may have logged into his account for the micro-blogging service with the account name "bill@email.com." The author's domain (also known as a namespace or domain name) may be "email.com." Thus, a list of registered domains may be queried to determine if dinosaur65 is a valid username for email.com (e.g., does the account dinosaur65@email.com exist?).

If the handle is valid for the author's domain, the corresponding user account may be selected as the identified account. If the handle is not valid, the server system 402 may determine if the handle is valid for a default domain (box 512). For example, each user of the micro-blogging service may be able to select a handle that is unique to a namespace for the micro-blogging service. The list of micro-blogging service handles may be queried to determine if the handle is among the list of unique handles. If a matching handle is identified, the corresponding account may be selected as the identified account.

In some implementations, the determination of box 512 is performed before the determination of box 510, and the determination of box 510 is dependent upon the determination of box 512 failing. In other words, the default domain may be queried first and the author's domain may be queried second. In some implementations, the determination of both boxes 510 and 512 are performed and scores for each handle—or each domain—are determined and weighed against each other in a process to select an appropriate account. In some examples, determining whether text that partially identifies a target recipient is associated with a valid first user account for a first domain or is associated with a valid second user account for a second domain is performed by the operations of boxes 510 and 512.

In some implementations, other domains (e.g., the domains 430 illustrated in system 400) are used in a selection of an identified domain. The identified domains 430 may be queried one at a time to identify if the handle is a valid username for the domain. Upon identifying a valid account, no additional domains may be queried. Thus, the domains may be checked in a ranked order. In other implementations, the valid domains are weighted and a user account is generated using the handle as the username and the most favorably weighted domain as the domain for the user account.

In some examples, the determinations of boxes 510 and 512 are performed without the receipt of additional user-input from the author's remote computing device. For example, the author may not be displayed a list of domains that are valid for the handle. Instead, the selection of one of multiple domains for the handle may be performed by the server system without any additional user-input from the user other than the identification of the handle in the original post. Thus, the server system may "intelligently" perform the domain selection, without querying the user for verification of the selected domain. The user, however, may be able to see information sufficient to identify a selected domain upon receiving a copy of the authored post. For example, the author's post may appear in his stream of posts and include the selected domain in addition to the handle (as discussed below).

In box 514, a post is optionally modified to include the identified account information. For example, the handle in the received post (e.g., dinosaur65) may be exchanged with a full account name (e.g., dinosaur65@email.com) or a display name for the user of the account (e.g., Frank Thompson). The operations of box 514 may be performed by the message reformatter 424.

In box 516, user accounts that subscribe to the author are identified. For example, individual users of the micro-blogging service that have selected to receive all posts that are authored by the author of the post are identified.

In box 518, the modified post is sent to accounts identified based on the handle and accounts identified based on the subscriptions (e.g., the accounts identified in boxes 508 and 516). The post may be sent from a server system to computing devices that have received user-supplied credentials for logging into the identified accounts, and have verified the validity of the credentials with the server system 402.

In some implementations, a user is logged into an account if a user supplies credentials (e.g., a username and domain) as part of a post, where the credentials are supplied to validate to the server system that the electronic message is from a legitimate source. In some implementations, the author's post may be posted to a publicly accessible profile page for the author. Non-subscribing users may view the post by visiting the profile page, however, each non-subscribing user may not receive the author's post inserted into a stream of posts that are compiled specifically for the user.

Figure 6:
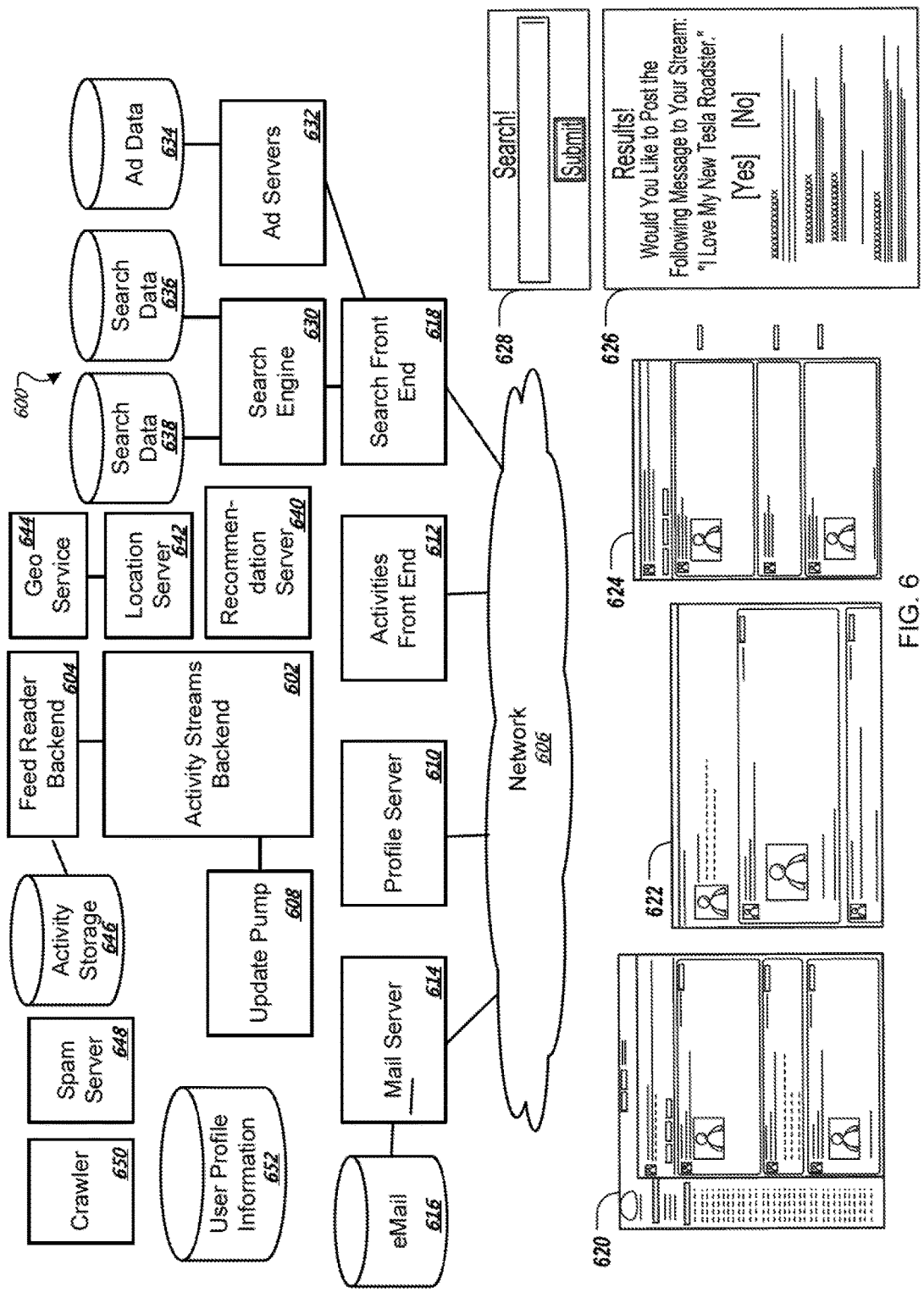
FIG. 6 is a schematic diagram of a system within which the various features described in this document may be implemented.

FIG. 6 is a schematic diagram of a system 600 within which the various features described in this document may be implemented. In general, the system 600 permits various users to post, review, and comment on various activity streams of information, within a social networking framework. For example, a user may make a micro-blogging post about a recent happening in the user's life or about a news article the user recently read. That post may be forwarded to other users who have chosen to follow the first user (who may be an individual or an organization). Those other users may see the post using a stream reader, or the post may be displayed in their email applications (e.g. either in line with their regular email messages or under a separate tab). Those users may choose to comment on the post, and other users may also comment on the post or comment on the comments of other users. Such comments may be included and shown in the various users email application even if they were made after the post was originally connected to the email application. Thus, the various types of feedback may be made available to each user conveniently in one place. Users may also see posts related to other users my visiting profile pages for those other users, and may also go to their own profile pages or to their stream pages to see all of the posts and comments for posts to which they are subscribed.

The various posts, and comments on posts, are managed in the system 600 by an activity streams backend 602, which is in charge of implementing business logic that defines the manner in which various submissions to the system 600 will be handled. The activity streams are characterized by activities, which are the subjects of posts (e.g., micro-blog posts) that users submit to the system 600, and various comments directed toward those activities. For example, a user may post an activity regarding a web page they are currently viewing by pasting a URL of the page into a posting page. Such action may cause the system 600 to gather important information form the URL, including images displayed on the page, headings, labels for images, or topical terms that describe a topic of the page (e.g., as previously determined by analysis of the words on the page, such as using ADSENSE analysis of the page). The system 600 may also obtain location information, such as the current location of the user, and/or a venue with which the user is most currently associated (e.g., that the user checked into recently or identified as a venue in which the user is located).

The activity streams back-end 602 also implements logic for determining what users are to receive posts, comments on posts, and other portions of streams in the system 600. In particular, users who have subscribed to receive posts form other users may be provided with posts when they log into the system 600, users may nominate other users to receive copies of streams when those other users would not ordinarily be included in the streams (e.g., by typing in identifiers for those other users when reviewing a post), and users may send streams directly to each other, among other things.

The feed reader back end 604 manages storage of posts and related data for the system 600. The feed reader back end 604 may rely on various levels of activity storage 646 to store posts, comments, on posts, and other information needed to construct streams for users when they request information from system 600. As with the other components shown in this figure, the feed reader back end 604, though shown as a single block, can be implemented using a number of different servers or server sub-systems Likewise, the activity storage 646 can be implemented across a number of databases and database types, and across a variety of servers and server sub-systems.

When posts or other updates are received by the activity stream back-end 602, they are formatted and provided to update pump 608. The update pump 608 is responsible for provided notices about newly-posted information to various services that may need such information. It acts, in effect, as a router and distributor of information relating to the system 600. For example, a mail server 614 may include functionality for integrating the display of streams, and may thus need to know about new posts so that users of a mail client can be shown immediately when new information is posted. In a similar manner, a search engine 630 may provide search results to users that include real-time updating information from various posts that users are supplying to the system, and can receive such updated information by interacting with the update pump 608 via understood APIs and remote procedure calls (RPCs) where the two components are sub-components of a larger organization-wide system.

Various web front-ends are provided to permit the system 600 communicate over a network 606, such as the internet (and adjacent supporting networks). For example, the mail server 614 may provide typical web-based electronic mail functionality, though with the integration of posts and comments into users' in boxes, via a mail client 620. For example, streams may show up as discrete messages in user's in box, and may be updated in real time to include the latest comments on the streams and originating posts for the streams. Such content may be active, in that a user may be allowed to interact with it substantially to a level that they could if they were reviewing the streams in a dedicated stream reader. For example, selectable controls may be provided with a stream that is displayed by the email client 620, and a user may choose one in order to post a comment to be added to a stream, without having to leave the context of the message within the email client 620.

A profile server 610 generates code for representing user profiles such as profile 622 of user Joe Blow. The profile page may take the form of a standard feed page from a social networking site, arranged with a list of posts and comments from other users in reverse chronological order. In a similar manner, an activities front end 612 can generate a similar feed for a user's feed page 624, here for a user named Susie User. The profile page 622 and the feed page 624 may be very similar to each other, and can present content similar to that presented as part of a posting or micro-blogging section of mail client 620. In one example, the profile page 622 is what third parties see when they look at the user's account, while the feed page 624 is what the user himself or herself sees.

A search engine 630 and associated search front end 618 may provide a different sort of functionality for the system 600. Specifically, the search front end 618 may allow users to provide posts or comments from non-traditional sources, such as search boxes, e.g., on a search web page or in a search box on a toolbar installed on their machines an operating in concert with their web browsers. Such posts or comments may be submitted by users and may be received by the search front end in a standard manner, just as search requests are. The intent of a user to submit a post rather than a search query (or in addition to a search query) may be determined by syntactical analysis of the submission. In one example, if a query is preceded by the letter "z", with a space after it (see screen 628)—a construct that is seldom submitted as a real search query—the system may parse the submission apart and assume, from the syntax, that the user intends to post the remainder of the submitted query as a post to their social network.

Such a post may be made immediately or after confirming with the submitting user that they would like to make a posting. For example, a search results page 626 may be generated that contains actual search results for the submitted query (whether with or without the preceding "z") generated by the search engine 630 using data from index 638 in a conventional manner, and may be displayed below an area that shows the user the form of a proposed post and selectable controls by which the user can edit the post and can then confirm an intent to post the information to friends, followers, or others. The post may then be forwarded by the search front end 618 to the activity streams backend 602, along with identifying information for the user (e.g., a user ID identified from a cookie on the user's computing device when the user is logged onto a broader service that implements the system 600).

Other syntax submitted by a user may produce different results. For example, if a user enters an email address (e.g., of the form "name@domain.com"), the system may identify that syntax as indicating an intent to send the remaining text of the submission as an email message to the user at the provided email address. Likewise, if the user starts a submission with a control character followed by a communication mode identifier, the remainder of the submission may be submitted for posting in that communication mode, either without or without first presenting the proposed action to the user and confirm that the user intends such a communication to occur. For example, if a user types "z blog I'm having a great time," the syntax may indicate to the system 600 that the user would like to post the submitted phrase "I'm having a good time" to the user's blog (where the identity of the blog may be determined by the system 600 using a user ID stored as a cookie on the user's computing device, and which can be correlated to an account for the user that is in turn correlated to the blog).

The search results and other information (e.g., posts and email messages) may be accompanied by targeted advertisements directed to the search query or other similar information, such as profile information, the text of posts or comments by a user, the text of posts or comments of users who have a relationship with a user (e.g., as friends, followers, or users that the first user follows). Such advertisements may be served, through the search front end 618, or the other front ends 610, 612, 614 to users of the system 600 and may be targeted using techniques like those employed in GOOGLE ADWORDS OR ADSENSE. Such serving of advertisements may depend on ad data in database 634, which may include information about advertisers, the text and other content for the advertisements, bid prices submitted by the various advertisers, and other relevant information needed to serves advertisements that are directed to users and/or streams of information directed from or to the users.

Various location-based services may be integrated with posts or comments, such as by identifying the locations (e.g., lat/long coordinates) or venues (e.g., stores, arenas, bars, or restaurants) from which posts or comments are made. Such services are provided in this example system 600 by a location server 642 and geo service 644. The location server 642 generally provides information about venues or other landmarks in response to receiving location information about a user of system 600. For example, when a user submits a post, geo-coordinates for the user may be provided with the post (e.g., via GPS functionality on the user's mobile computing device) or may be determined for the user by the system 600 (e.g., via cell tower or access point identification or triangulation). The geo-location information may be an estimated latitude and longitude of the mobile computing device and information identifying an accuracy of the estimation. The location server 642 may be made available through an API to various other components of the system 600.

The location server 642 may use such geo-location information to identify one or more venues (e.g., stores, restaurants, or bars) in the general location of the user, may use proximity of the user to each venue and other signals (e.g., popularity of each venue as determined from search queries submitted with the venue name, check-ins at the venue by users of the system 600, a volume of activity associated with posts from the venue, a reputation of a post's author, for example, through number of subscribers, a volume of comments on posts, or a similarly determined reputation of the subscribers) to provide a ranked list of venues in the geographic area that the user may be in. The user may be presented with a single suggestion for a venue or several suggested venues. The user may then select one such venue, and that venue may be associated with the post when other users review it. For example, the post may be accompanied by meta data indicating that the post was "Posted from Dive Bar," and other users may select the name "Dive Bar" to see additional information about the venue, including other posts from the venue, ratings of the venue, streams that belong to the venue (e.g., if a manager of the venue has made the venue a user of the system 600) and other similar information.

The location server 642 may obtain information that it needs to provide such functionality from various external services, such as geo service 644. Geo service 644 may be a service that communicates via standard APIs to receive location information (e.g., lat/long coordinates) and to provide more advanced information in response. The more advanced information may include a street address that is determined to be associated with the lat/long coordinates (e.g., a street address that is nearest to a particular location represented by the lat/long coordinates). The more advance information may also include a list of venue names that are geographically near the particular location, street addresses for the venues, descriptive information for the venues, map tiles that are associated with the particular location, and a relevance score for each venue. The relevance score for each venue may identify how relevant the particular venue is based on any combination of (i) the received location information, (ii) an accuracy of the received location information, and (iii) a distance between the venue and a location identified by the received location information.

Other components may interact with the components already described to provide additional functionality foe the system 600. For example, a crawler 650 may crawl various posts and comments for the purpose of indexing the content in the system 600, so that, for example, search engine 630 may readily deliver search results that include the latest postings by users to the system 600. Also, spam server 648 may communicate with the activity streams backend 602 and/or the update pump 608 to identify posts or comments that may be inappropriate (e.g., offensive, abusive, or otherwise inappropriate), duplicative, deceptive (e.g., in which one user poses as another user), and to act appropriately with respect to such content (e.g., providing for automatic and/or manual review of the content and perhaps removing the content from the system 600 or making the content hidden).

Finally, a recommendation server 640 may be provided with any new activity or post that is submitted to the system 600 (e.g., via the activity streams back-end 602). The recommendation server 640 may write back to the activity streams backend 602 about the number of people who should receive the activity. Such information may be saved so that the next time a message is sent out about the activity (e.g., a comment on the activity), the new recommended users also get the activity. A quality score can be computed when determining what users should receive an activity, and the score can be determined by factors such as the distance of relationship between a user and other users who have posted to or recommended an activity, interests of a user as identified in the user's profile (e.g., the user is a member of a classic cars group in a social network, and thus is more likely to receive notices about activities relating to classic cars), or interests as identified by posts or other submissions that the user makes, users or activities that the user follows, and the like. A quality threshold may be set by the recommendation server 640 in order to maintain an adequate level of recommendations (not too many and not too few).

Using the components described here, then, the system 600 may provided for integration of various modes of posting and receiving content that is provided in streams, such as micro-blog posts and comments on such posts. Users may post in various ways, including directly into search boxes on search pages or toolbars, so that such users may be more tightly integrated into systems provided by the providers of the pages or toolbars, and may provide posts in contexts with which they are already very familiar. Also, the users may review posts and other content in their email client, also in a manner that is already familiar to them and does not require them to leave a familiar application in order to review such posts. Moreover, the content may be rich for the users, such that it may include information about locations and venues at those locations (from which a reader of the content may obtain additional information, such as from hyperlinks provided in posts), and the users may respond to posts in-line, such as from their email applications. In all these, ways the system 600 may provide a communication facility that allows a user simpler and more complete interaction with friends and with other users, and may increase the level of knowledge that is made available to the users of the system 600.

Figure 7:
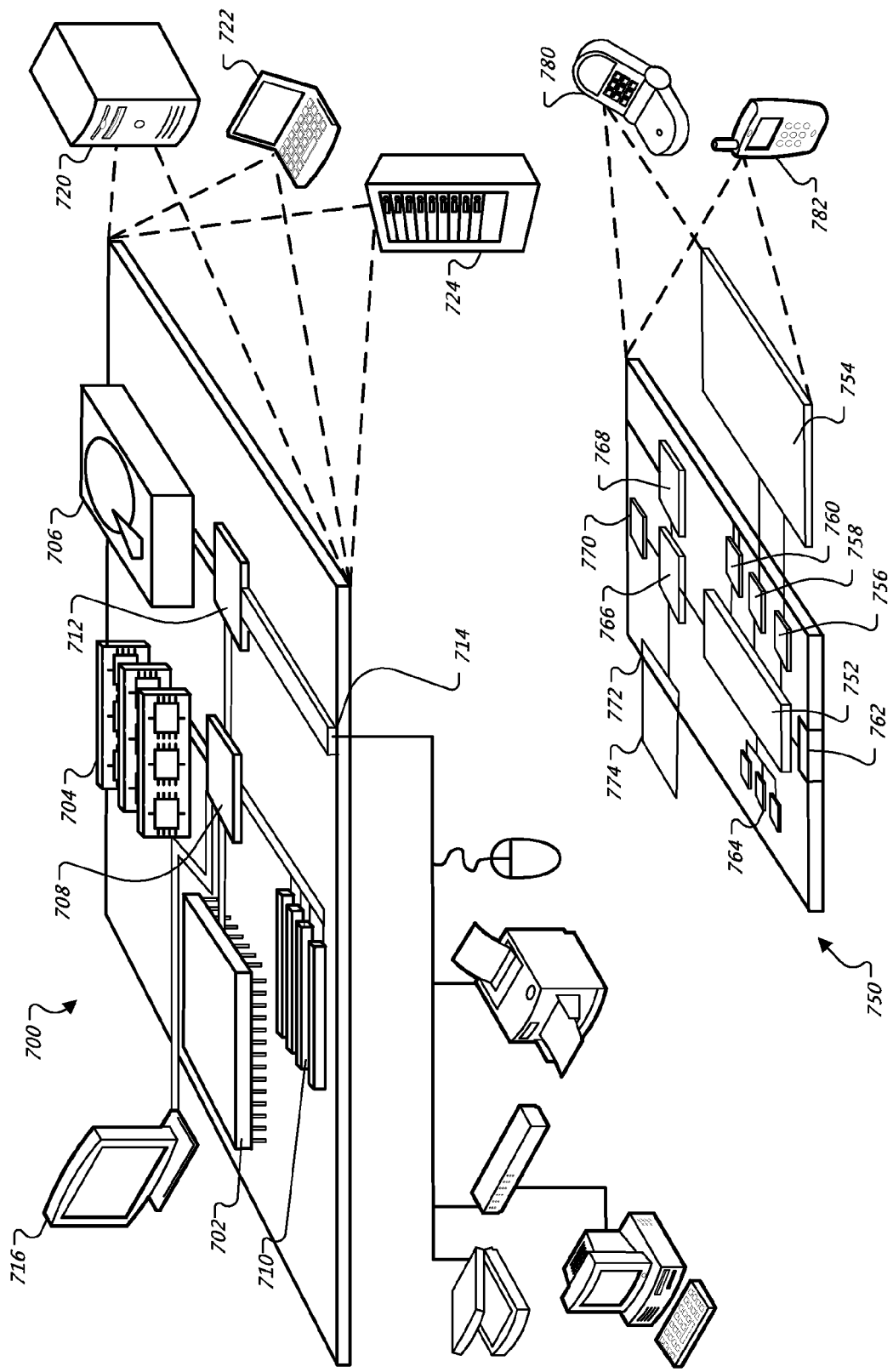
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for identifying message recipients may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   receiving, at a computing system and as having been sent by a first remote computing device, an electronic message that includes a username but does not include information that fully identifies a recipient for the electronic message;
   identifying, by the computing system, multiple domains for which the username may be valid, including a first domain and a second domain;
   querying, by the computing system, the first domain to determine that the username in the electronic message is not a valid username for the first domain;
   querying, by the computing system, the second domain to determine that the username in the electronic message is a valid username for the second domain;
   selecting, by the computing system and based on having determined that the username in the electronic message is not a valid username for the first domain but is a valid username for the second domain, to transmit the electronic message to a user account that is associated with the username and the second domain;
   identifying, by the computing system, a second remote computing device that is associated with the user account and to which the electronic message is to be transmitted;
   modifying, by the computing system and before the electronic message is transmitted to the second remote computing device, the electronic message to add the second domain into the electronic message, so that the electronic message includes information that fully identifies the recipient for the electronic message; and
   transmitting, by the computing system as a result of having selected to transmit the electronic message to the user account, the electronic message that has been modified to include the second domain to the second remote computing device that is associated with the user account.

2. The computer-implemented method of claim 1, further comprising:
   determining, by the computing system, a display name for the user account; and
   modifying, by the computing system and before the electronic message is transmitted to the second remote computing device, the electronic message to replace the username with the display name for the user account.

3. The computer-implemented method of claim 2, wherein:
   a name of the user account, of which the username is a portion, includes an email address, and
   the display name is not an email address.

4. The computer-implemented method of claim 1, wherein between (i) the computing system receiving the electronic message and (ii) the computing system selecting to transmit the message to the user account, the computing system does not receive a communication from the first remote computing device that identifies the second domain.

5. The computer-implemented method of claim 1, wherein an author of the electronic message has not specified that the recipient for the electronic message is the user account.

6. The computer-implemented method of claim 1, wherein:
   the user account is in the format "username@domain_name";
   the username in the electronic message is the "username" portion of the user account; and
   the electronic message does not include the "domain_name" portion of the user account when the electronic message is received with the username but without the information that fully identifies the recipient for the electronic message.

7. The computer-implemented method of claim 1, wherein:
   querying the first domain to determine that the username in the electronic message is not a valid username for the first domain is performed without an author of the electronic message specifying that the username in the electronic message is not a valid username for the first domain, and
   querying the second domain to determined that the username in the electronic message is a valid username for the second domain is performed without the author of the electronic message specifying that the username in the electronic message is a valid username for the second domain.

8. The computer-implemented method of claim 7, further comprising selecting the first domain as a domain to use in the determination that the username in the electronic message is not a valid username for the first domain, as a result of the computing system identifying that the electronic message was authored by a first user of a messaging service that logged into the messaging service using a particular user account that included a particular username and the first domain.

9. The computer-implemented method of claim 1, wherein the information that is not included in the electronic message is the second domain.

10. The computer-implemented method of claim 1, wherein the electronic message does not include a name of the first domain, and does not include a name of the second domain.

11. The computer-implemented method of claim 1, wherein:
the transmitted message includes an email address that identifies the recipient for the electronic message, and
the electronic message does not include the email address that identifies the recipient for the electronic message before the computing system selects to transmit the electronic message to the user account.

12. The computer-implemented method of claim 1, wherein:
the username is included in a body of the electronic message in distinction to a "to" field of a header of the electronic message, and
the body of the electronic message includes, in addition to the username, prose that does not identify the recipient for the electronic message.

13. The computer-implemented method of claim 1, wherein:
the username is included in either (i) a "to" field in a header of the electronic message, or (ii) a body of the electronic message in distinction to the "to" field, and
the electronic message does not include a domain name before the computing system determines that the username is a valid username for the second account.

14. One or more non-transitory computer-readable medium storing instructions that, when executed by one or more processors, cause performance of operations that comprise:
receiving, at a computing system and as having been sent by a first remote computing device, an electronic message that includes a username but does not include information that fully identifies a recipient for the electronic message;
identifying, by the computing system, multiple domains for which the username may be valid, including a first domain and a second domain;
querying, by the computing system, the first domain to determine that the username in the electronic message is not a valid username for the first domain;
querying, by the computing system, the second domain to determine that the username in the electronic message is a valid username for the second domain;
selecting, by the computing system and based on having determined that the username in the electronic message is not a valid username for the first domain but is a valid username for the second domain, to transmit the electronic message to a user account that is associated with the username and the second domain;
identifying, by the computing system, a second remote computing device that is associated with the user account and to which the electronic message is to be transmitted;
modifying, by the computing system and before the electronic message is transmitted to the second remote computing device, the electronic message to add the second domain into the electronic message, so that the electronic message includes information that fully identifies the recipient for the electronic message; and
transmitting, by the computing system as a result of having selected to transmit the electronic message to the user account, the electronic message that has been modified to include the second domain to the second remote computing device that is associated with the user account.

15. The one or more non-transitory computer-readable medium of claim 14, wherein the operations further comprise:
determining, by the computing system, a display name for the user account; and
modifying, by the computing system and before the electronic message is transmitted to the second remote computing device, the electronic message to replace the username with the display name for the user account.

16. The one or more non-transitory computer-readable medium of claim 15, wherein:
a name of the user account, of which the username is a portion, includes an email address, and
the display name is not an email address.

17. The one or more non-transitory computer-readable medium of claim 14, wherein between (i) the computing system receiving the electronic message and (ii) the computing system selecting to transmit the message to the user account, the computing system does not receive a communication from the first remote computing device that identifies the second domain.

18. The one or more non-transitory computer-readable medium of claim 14, wherein an author of the electronic message has not specified that the recipient for the electronic message is the user account.

19. The one or more non-transitory computer-readable medium of claim 14, wherein:
the user account is in the format "username@domain_name";
the username in the electronic message is the "username" portion of the user account; and
the electronic message does not include the "domain_name" portion of the user account when the electronic message is received with the username but without the information that fully identifies the recipient for the electronic message.

20. The one or more non-transitory computer-readable medium of claim 14, wherein:
querying the first domain to determine that the username in the electronic message is not a valid username for the first domain is performed without an author of the electronic message specifying that the username in the electronic message is not a valid username for the first domain, and
querying the second domain to determine that the username in the electronic message is a valid username for the second domain is performed without the author of the electronic message specifying that the username in the electronic message is a valid username for the second domain.

21. The one or more non-transitory computer-readable medium of claim 20, wherein the operations further comprise selecting the first domain as a domain to use in the determination that the username in the electronic message is not a valid username for the first domain, as a result of the computing system identifying that the electronic message was authored by a first user of a messaging service that logged into the messaging service using a particular user account that included a particular username and the first domain.

* * * * *